United States Patent
Zhao et al.

(10) Patent No.: US 12,548,102 B2
(45) Date of Patent: Feb. 10, 2026

(54) PORT DEPARTURE SERVICE PROCESSING METHOD, APPARATUS AND SYSTEM

(71) Applicant: TravelSky Technology Limited, Beijing (CN)

(72) Inventors: Zhijun Zhao, Beijing (CN); Ming Zhang, Beijing (CN); Songyang Zhang, Beijing (CN); Wenhui Wang, Beijing (CN); Yue Yu, Beijing (CN)

(73) Assignee: TravelSky Technology Limited, Beijing (CN)

( * ) Notice: Subject to any disclaimer, the term of this patent is extended or adjusted under 35 U.S.C. 154(b) by 194 days.

(21) Appl. No.: 18/272,558

(22) PCT Filed: Dec. 6, 2021

(86) PCT No.: PCT/CN2021/135666
§ 371 (c)(1),
(2) Date: Jul. 14, 2023

(87) PCT Pub. No.: WO2022/151866
PCT Pub. Date: Jul. 21, 2022

(65) Prior Publication Data
US 2024/0070797 A1    Feb. 29, 2024

(30) Foreign Application Priority Data
Jan. 18, 2021   (CN) .......................... 202110063935.4

(51) Int. Cl.
*G06Q 50/40*      (2024.01)
(52) U.S. Cl.
CPC .................................... *G06Q 50/40* (2024.01)
(58) Field of Classification Search
CPC ...................................................... G06Q 50/40
(Continued)

(56) References Cited

U.S. PATENT DOCUMENTS

| | | | |
|---|---|---|---|
| 5,835,915 A * | 11/1998 | Carr | G06F 11/2097 714/E11.107 |
| 2018/0260741 A1* | 9/2018 | Lamoureux | G06Q 30/06 |
| 2019/0354902 A1* | 11/2019 | Huntley, III | G06F 16/90 |

FOREIGN PATENT DOCUMENTS

| | | |
|---|---|---|
| CN | 102096877 A | 6/2011 |
| CN | 104537490 A | 4/2015 |

(Continued)

OTHER PUBLICATIONS

International Search Report and Written Opinion for International Application No. PCT/CN2021/135666, mailed Mar. 2, 2022.

(Continued)

*Primary Examiner* — Mahmoud S Ismail
(74) *Attorney, Agent, or Firm* — Wolf, Greenfield & Sacks, P.C.

(57) ABSTRACT

A port departure service processing method, apparatus and system. The method includes: determining the current master control system for executing a port departure service; during the process of executing the port departure service, if an error is detected in operating data of the current master control system, switching the unfinished port departure service to another normally operating system so as to continue execution; if the execution of the port departure service is not completed and after it is detected that the operating data of the current master control system returns to normal, switching to the current master control system to continue to execute the remaining port departure service; and after switching from the current master control system to the other system or switching from the other system back to the current master control system, correcting inconsistent data before and after switching.

8 Claims, 7 Drawing Sheets

(58) Field of Classification Search
USPC .......................................................... 701/15
See application file for complete search history.

(56) References Cited

FOREIGN PATENT DOCUMENTS

| | | |
|---|---|---|
| CN | 105827435 A | 8/2016 |
| CN | 107547649 A | 1/2018 |
| CN | 108573024 A | 9/2018 |
| CN | 109240627 A | 1/2019 |
| CN | 110673981 A | 1/2020 |
| CN | 112905393 A | 6/2021 |

OTHER PUBLICATIONS

First Office Action for Chinese Application No. 202110063935.4, dated Jul. 11, 2023.

\* cited by examiner

PORT DEPARTURE SERVICE PROCESSING METHOD, APPARATUS AND SYSTEM

This application is a national stage filing under 35 U.S.C. § 371 of International Patent Application Serial No. PCT/CN2021/135666, filed Dec. 6, 2021, which claims priority to Chinese Patent Application No. 202110063935.4, titled "PORT DEPARTURE SERVICE PROCESSING METHOD, APPARATUS AND SYSTEM", filed on Jan. 18, 2021 with the China National Intellectual Property Administration. The contents of these applications are incorporated herein by reference in their entireties.

FIELD

The present application relates to the technical field of civil aviation service management, and in particular to a method for processing a departure service, an apparatus for processing a departure service, and a system for processing a departure service.

BACKGROUND

With the rapid development of aerospace technology, service competitions between airlines are improved, the construction of a "smart airport" is promoted, and it is required to perform automatic and intelligent method to process complex passenger business service.

According to the conventional technology, the host templates in the airport service front-ends have outdated technical framework and huge and complex internal implementation logic, failing to meet the requirements for automatic, intelligent and process-oriented services.

SUMMARY

In view of this, a method for processing a departure service, an apparatus for processing a departure service and a system for processing a departure service are provided according to the embodiments of the present disclosure to perform automatic, intelligent and process-oriented processing on departure services.

In order to achieve the above objectives, the following technical solutions are provided according to the embodiments of the present disclosure.

In a first aspect, a method for processing a departure service is provided according to an embodiment of the present disclosure. The method includes: determining a current master control system for processing the departure service, and processing the departure service by using the current master control system; switching, on detecting that the current master control system operates abnormally in processing the departure service, from the current master control system to another system operating normally to process the departure service; switching, on detecting that the current master control system resumes normal operation before the departure service is processed, from the another system to the current master control system to process the departure service; and after switching from the current master control system to the another system or switching from the another system to the current master control system, correcting inconsistent data.

In an embodiment, the determining a current master control system for processing the departure service and processing the departure service by using the current master control system includes: obtaining a master control flight list request from an airport service front-end APG, and calling an interface of an open departure control system DC based on the master control flight list request to obtain a master control flight list; forwarding the master control flight list to the APG, where the APG sores the master control flight list in a cache; in response to a master control system calling instruction from the APG, performing a calling operation based on the master control system calling instruction, and determining the current master control system, where the master control calling instruction includes: a master control calling instruction indicating only accessing the DC or only accessing a departure host DCS or a master control calling instruction indicating accessing both a departure host DCS and the DC; and processing the departure service by using the current master control system.

In an embodiment, the method further includes: in response to DEP BACKUP FLIGHT information from the DCS, forwarding the DEP BACKUP FLIGHT information to the APG, where the APG transmits a master control flight list request based on the DEP BACKUP FLIGHT information; in response to NOT DISTRIBUTARY FLIGHT information from the DC, forwarding the NOT DISTRIBUTARY FLIGHT information to the APG, where the APG transmits a master control flight list request based on the NOT DISTRIBUTARY FLIGHT information; receiving the master control flight list request, and calling the interface of the DC based on the master control flight list request to obtain a master control flight list; and forwarding the master control flight list to the APG, where the APG updates the cache based on the received master control flight list.

In an embodiment, the method further includes: in a case that the interface of the DC is called N times based on the master control flight list request and no master control flight list is fed back from the DC, outputting first prompt information, where the APG transmits the master control system calling instruction indicating only accessing the DCS, and the first prompt information indicates a DC failure.

In an embodiment, the switching, on detecting that the current master control system operates abnormally in processing the departure service, from the current master control system to another system operating normally to process the uncompleted departure service includes: in a case that no result is received from a DC in querying a master control flight list, controlling an APG to output first prompt information, where the first prompt information indicates a DC failure; and/or in a case that a DC transfers information of a flight, with a DCS as a master control system, to a master control flight list, obtaining a transferred master control flight list, and generating second prompt information, where the second prompt information indicates that master control systems of flights are different; and calling an interface of the DC based on the second prompt information to obtain the transferred master control flight list, and forwarding the transferred master control flight list to an APG, where the APG updates a cache; and/or in a case that an abnormal operation is monitored in an DC performing a flight service operation, generating third prompt information, where an APG updates a master control flight list to delete information of a flight with the abnormal operation, the third prompt information indicates abnormal flight information, and the flight service operation includes at least a passenger check-in operation, a boarding operation, and/or a flight change operation; adding the information of the flight with the abnormal operation to the master control flight list, and changing a master control system of the flight with the abnormal operation to a DCS.

In an embodiment, the after switching from the current master control system to the another system or switching from the another system back to the current master control system, correcting inconsistent data includes: in a case that a DC performs a passenger check-in operation for a flight, confirming that a master control system of the flight is switched to a DCS, querying passenger information by using an APG, and correcting the passenger information; in a case that a DC performs a passenger transferring operation for a flight, controlling an APG to only display flights with the DC as a master control system; and in a case that a DCS performs a passenger transferring operation for a flight, controlling an APG to only display flights with the DCS as a master control system.

In a second aspect, an apparatus for processing a departure service is provided according to an embodiment of the present disclosure. The apparatus includes a master control determination component, an intelligent switching component, and a data correction component.

The master control determination component is configured to determine a current master control system for processing departure service and process the departure service by using the current master control system.

The intelligent switching component is configured to: switch, on detecting that the current master control system operates abnormally in processing the departure service, from the current master control system to another system operating normally to process the departure service; and switch, on detecting that the current master control system resumes normal operation before the departure service is processed, from the another system to the current master control system to process the departure service.

The data correction component is configured to: after switching from the current master control system to the another system or switching from the another system to the current master control system, correct inconsistent data.

In an embodiment, the master control determination component includes a first obtaining module, a first caching module, a first processing module, and an execution module.

The first obtaining module is configured to obtain a master control flight list request from an airport service front-end APG, and call an interface of an open departure control system DC based on the master control flight list request to obtain a master control flight list.

The first caching module is configured to forward the master control flight list to the APG, where the APG sores the master control flight list in a cache.

The first processing module is configured to: in response to a master control system calling instruction from the APG, perform a calling operation based on the master control system calling instruction, and determine the current master control system, where the master control calling instruction includes: a master control calling instruction indicating only accessing the DC or only accessing a departure host DCS or a master control calling instruction indicating accessing both a departure host DCS and the DC.

The execution module is configured to process the departure service by using the current master control system.

In an embodiment, the master control determination component further includes a second processing module, a second obtaining module, and a second caching module.

The second processing module is configured to: in response to DEP BACKUP FLIGHT information from the DCS, forward the DEP BACKUP FLIGHT information to the APG, where the APG transmits a master control flight list request based on the DEP BACKUP FLIGHT information; and in response to NOT DISTRIBUTARY FLIGHT information from the DC, forward the NOT DISTRIBUTARY FLIGHT information to the APG, where the APG transmits a master control flight list request based on the NOT DISTRIBUTARY FLIGHT information.

The second obtaining module is configured to receive the master control flight list request, and call the interface of the DC based on the master control flight list request to obtain a master control flight list.

The second caching module is configured to forward the master control flight list to the APG, where the APG updates the cache based on the received master control flight list.

In a third aspect, a system for processing a departure service is provided according to an embodiment of the present disclosure. The system includes: an apparatus for processing a departure service, an airport service front-end APG, a departure host DCS, and an open departure control system DC.

The apparatus for processing a departure service is configured to: receive a master control flight list request from the airport service front-end APG, determine whether a current master control system for processing the departure service is the DCS or the DC, and process the departure service by using the current master control system; switch, on detecting that the current master control system operates abnormally in processing the departure service, from the current master control system to another system operating normally to process the departure service; switch, on detecting that the current master control system resumes normal operation before the departure service is processed, from the another system to the current master control system to process the departure service; and after switching from the current master control system to the another system or switching from the another system to the current master control system, correct inconsistent data.

The airport service front-end APG is configured to transmit the master control flight list request, and provide a front-end interaction interface for the current master control system.

The departure host DCS is configured to, in a case of serving as the current master control system, process the departure service.

The open departure control system DC is configured to, in a case of serving as the current master control system, process the departure service.

Based on the method, the apparatus and the system for processing a departure service according to the embodiments of the present disclosure, a current master control system for processing the departure service is determined, and the departure service is processed by using the current master control system; on detecting that the current master control system operates abnormally in processing the departure service, switching is performed from the current master control system to another system operating normally to process the departure service; on detecting that the current master control system resumes normal operation before the departure service is processed, switching is performed from the another system to the current master control system to process the departure service; and after switching from the current master control system to the another system or switching from the another system to the current master control system, inconsistent data is corrected. According to the present disclosure, the current master control system for processing the departure service is determined, and then the DCS (Departure Control System or departure host) or the DC (Open Departure Control System) is used to process the departure service based on the current master control system. In a case that one of the DCS and DC fails, switching may be performed to process the departure service by using the other one of the DCS and DC that operates normally, performing automatic, intelligent and process-oriented processing on the departure service, reducing manual intervention, and thereby improving the efficiency of processing the departure service.

BRIEF DESCRIPTION OF THE DRAWINGS

For more clearly illustrating technical solutions in embodiments of the present disclosure or in the conventional technology, the drawings referred to for describing the embodiments or the conventional technology will be briefly described hereinafter. Apparently, the drawings in the following description are only some examples of the present disclosure, and for those skilled in the art, other drawings may be obtained based on the provided drawings without any creative efforts.

DETAILED DESCRIPTION OF THE EMBODIMENTS

Hereinafter, the technical solutions in the embodiments of the present disclosure are clearly and completely described in conjunction with the drawings in the embodiments of the present disclosure. Apparently, the embodiments described below are only some embodiments of the present disclosure, rather than all embodiments. Based on the embodiments in the present disclosure, all of the other embodiments which are obtained by those skilled in the art without any creative efforts fall within the protection scope of the present disclosure.

In the present disclosure, terms "include", "comprise" or any other variants thereof are intended to be non-exclusive. Therefore, a process, method, article or device including a series of elements includes not only these elements but also elements that are not enumerated, or elements that are inherent to the process, method, article or device. Unless expressively limited otherwise, a process, method, article or device limited by "comprising/including a(n) . . . " does not exclude existence of another identical element in such process, method, article or device.

As can be seen from the background technology, the conventional host templates in the airport service front-ends have outdated technical framework and huge and complex internal implementation logic, failing to meet the requirements for automatic, intelligent and process-oriented services.

Therefore, a method, an apparatus and a system for processing a departure service are provided according to the embodiments of the present disclosure. According to the present disclosure, the current master control system for processing the departure service is determined, and then a DCS or a DC is used to process the departure service based on the current master control system. In a case that one of the DCS and DC fails, switching may be performed to process the departure service by using the other one of the DCS and DC that operates normally, performing automatic, intelligent and process-oriented processing on the departure service, reducing manual intervention, and thereby improving the efficiency of processing the departure service.

Figure 1:
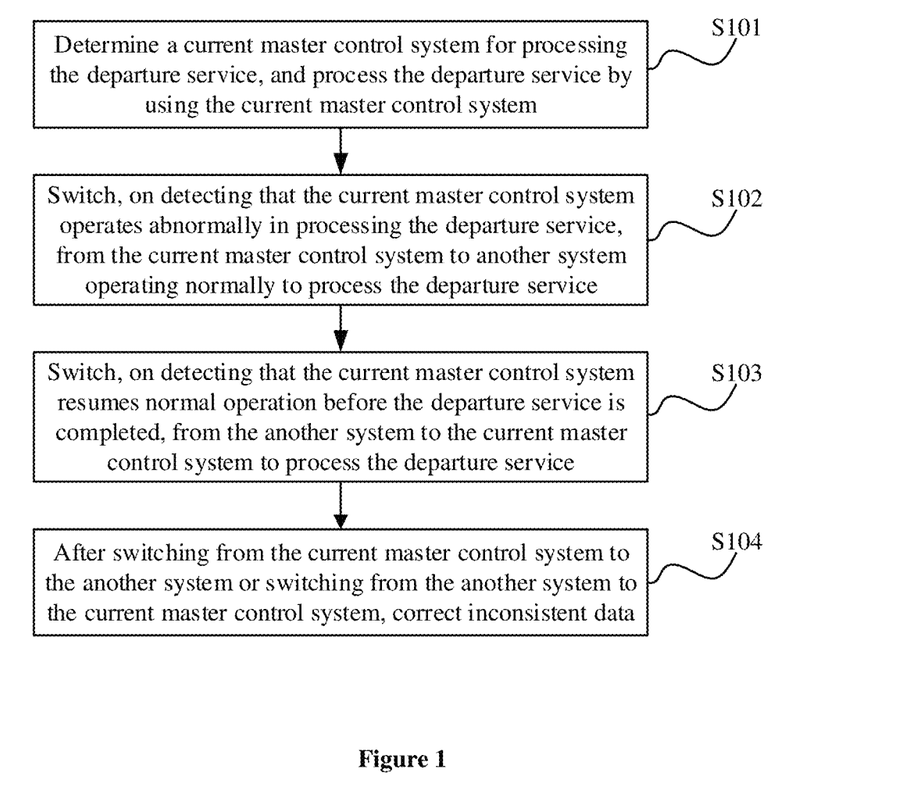
FIG. 1 is a flowchart of a method for processing a departure service according to an embodiment of the present disclosure.

Reference is made to FIG. 1, which shows a flowchart of a method for processing a departure service according to an embodiment of the present disclosure. The method includes the following steps S101 to S104.

In step S101, a current master control system for processing the departure service is determined, and then the departure service is processed by using the current master control system.

In performing step S101, it is determined whether a DCS or a DC serves as a current master control system for processing the departure service based on a master control flight list request from an APG (an airport service front-end), and then the current master control system processes the departure service.

In step S102, on detecting that the current master control system operates abnormally in processing the departure service, switching is performed from the current master control system to another system operating normally to process the departure service.

In performing step S102, the current master control processing the departure service and the operation data are monitored in processing the departure service, and in a case that the DC serves as the current master control system and operates abnormally, switching is performed from the DC to the DCS that operates normally to process the departure service uncompleted by the DC.

In step S103, on detecting that the current master control system resumes normal operation before the departure service is completed, switching is performed to the current master control system to process the departure service.

In performing step S103, the current master control processing the departure service and the operation data are monitored in processing the departure service, and in a case that the DC serves as the current master control system and resumes normal operation before the departure service is completed, the current master control system is switched to the DC to process the departure service uncompleted by the another system.

In step S104, after switching from the current master control system to the another system or switching from the another system to the current master control system, inconsistent data is corrected.

In performing step S104, after the current master control system is switched from the DC to the DCS or the current master control system is switched from the DCS to the DC, data that is inconsistent before and after switching is corrected based on data queried by using the APG.

Based on the method for processing a departure service according to the embodiments of the present disclosure, a current master control system for processing the departure service is determined, and the departure service is processed by using the current master control system; on detecting that the current master control system operates abnormally in processing the departure service, switching is performed from the current master control system to another system operating normally to process the departure service; on detecting that the current master control system resumes normal operation before the departure service is processed, switching is performed from the another system to the current master control system to process the departure service; and after switching from the current master control system to the another system or switching from the another system to the current master control system, inconsistent data is corrected. According to the present disclosure, the current master control system for processing the departure service is determined, and then the DCS or the DC is used to process the departure service based on the current master control system. In a case that one of the DCS and DC fails, switching may be performed to process the departure service by using the other one of the DCS and DC that operates normally, performing automatic, intelligent and process-oriented processing on the departure service, reducing manual intervention, and thereby improving the efficiency of processing the departure service.

Figure 2:
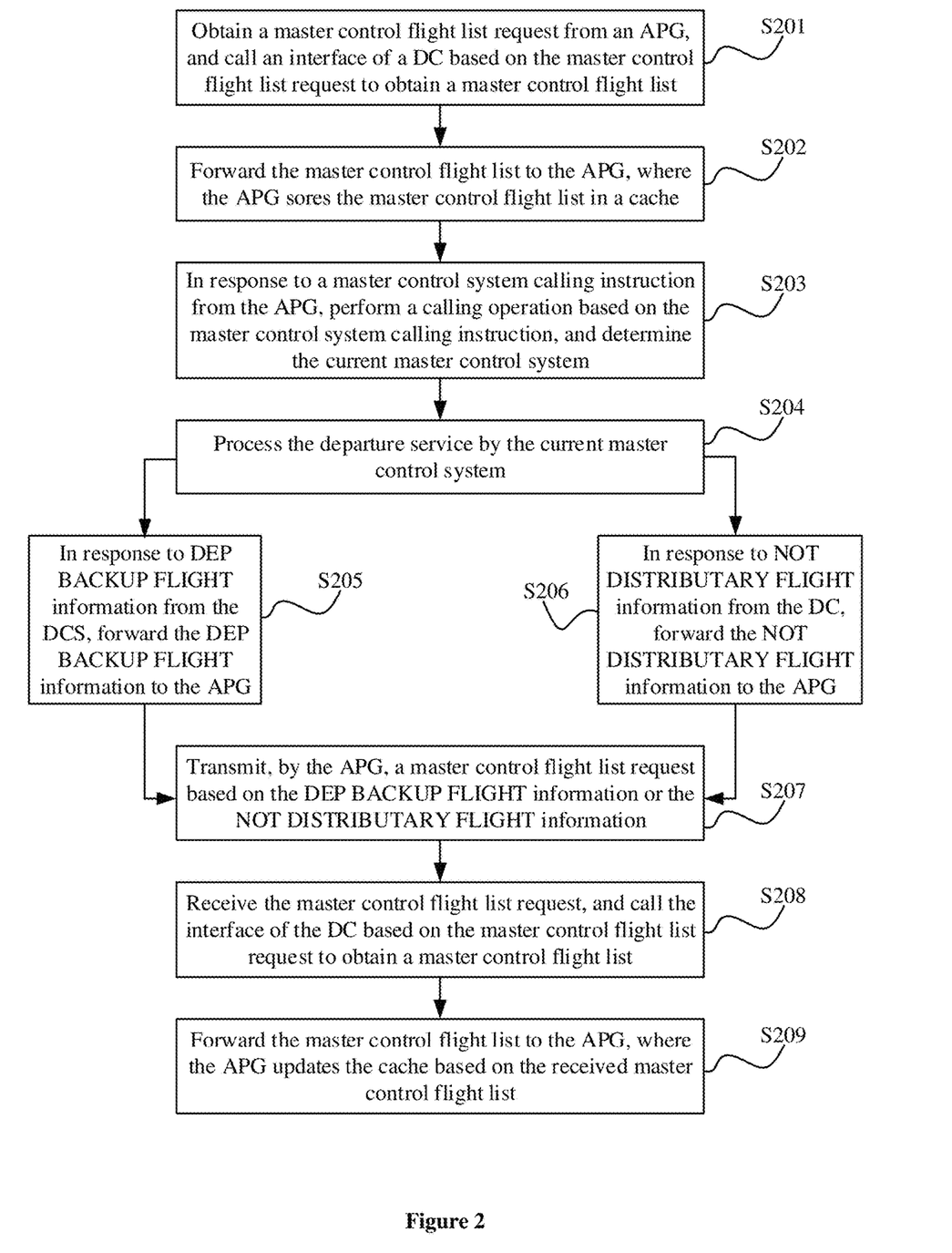
FIG. 2 is a flowchart of determining a current master control system for processing a departure service according to an embodiment of the present disclosure.

Based on the method for processing a departure service according to the above embodiments of the present disclosure, in performing step S101, a current master control system for processing the departure service is determined and the departure service is processed by the current master control system. FIG. 2 shows a flowchart of determining a current master control system for processing a departure service according to an embodiment of the present disclosure. The process includes the following steps S201 to S209.

In step S201, a master control flight list request is obtained from an APG, and an interface of a DC is called based on the master control flight list request to obtain a master control flight list.

In performing step S201, the master control flight list request is obtained from the APG, then the DCS is called based on the master control flight list request to obtain the master control flight list, and then a DEP (Data Execution Prevention) is called to process the master control flight list request to obtain the master control flight list protected by the DEP. Then, an interface of the DC is called to obtain the master control flight list.

In an embodiment of the present disclosure, in a case that the interface of the DC is called N times based on the master control flight list request and no master control flight list is fed back from the DC, first prompt information is outputted, so that the APG transmits a master control system calling instruction indicating only accessing the DCS. The first prompt information indicates a DC failure.

In step S202, the master control flight list is forwarded to the APG, and the APG sores the master control flight list in a cache.

In performing step S202, the obtained master control flight list is forwarded to the APG, and the APG sores the master control flight list in a cache.

In step S203, in response to a master control system calling instruction from the APG, a calling operation is performed based on the master control system calling instruction, and the current master control system is determined.

In the above step S203, the master control calling instruction includes: a master control calling instruction indicating only accessing the DC or only accessing the DCS, or a master control calling instruction indicating accessing both the DCS and the DC.

In performing step S203, based on the obtained master control system calling instruction from the APG, a calling operation is performed, and then it is determined whether the DCS or the DC serves as the current master control system.

In step S204, the current master control system processes the departure service.

In step S205, in response to DEP BACKUP FLIGHT information from the DCS, the DEP BACKUP FLIGHT information is forwarded to the APG.

In performing step S205, in a case that the DCS serves as the current master control system and DEP BACKUP FLIGHT information is received from the DCS, the DEP BACKUP FLIGHT information is forwarded to the APG.

In step S206, in response to NOT DISTRIBUTARY FLIGHT information from the DC, the NOT DISTRIBUTARY FLIGHT information is forwarded to the APG.

In performing step S206, in a case that the DC serves as the current master control system and NOT DISTRIBUTARY FLIGHT information received from the DC, the NOT DISTRIBUTARY FLIGHT information is forwarded to the APG.

In step S207, the APG transmits a master control flight list request based on the DEP BACKUP FLIGHT information or the NOT DISTRIBUTARY FLIGHT information.

In performing step S207, based on the received DEP BACKUP FLIGHT information or the NOT DISTRIBUTARY FLIGHT information, the APG transmits a master control flight list request.

In step S208, the master control flight list request is received, and the interface of the DC is called based on the master control flight list request to obtain a master control flight list.

In performing step S208, the master control flight list request is received, and the interface of the DC is called based on the master control flight list request to obtain a master control flight list.

In step S209, the master control flight list is forwarded to the APG, and the APG updates the cache based on the received master control flight list.

In performing step S209, the master control flight list is forwarded to the APG, and the APG updates the master control flight list stored in the cache based on the newly received master control flight list.

Based on the method for processing a departure service according to the embodiments of the present disclosure, a current master control system for processing the departure service is determined, and the departure service is processed by using the current master control system; on detecting that the current master control system operates abnormally in processing the departure service, switching is performed from the current master control system to another system operating normally to process the departure service; on detecting that the current master control system resumes normal operation before the departure service is processed, switching is performed from the another system to the current master control system to process the departure service; and after switching from the current master control system to the another system or switching from the another system to the current master control system, inconsistent data is corrected. According to the present disclosure, the current master control system for processing the departure service is determined, and then the DCS or the DC is used to process the departure service based on the current master control system. In a case that one of the DCS and DC fails, switching may be performed to process the departure service by using the other one of the DCS and DC that operates normally, performing automatic, intelligent and process-oriented processing on the departure service, reducing manual intervention, and thereby improving the efficiency of processing the departure service.

Figure 3:
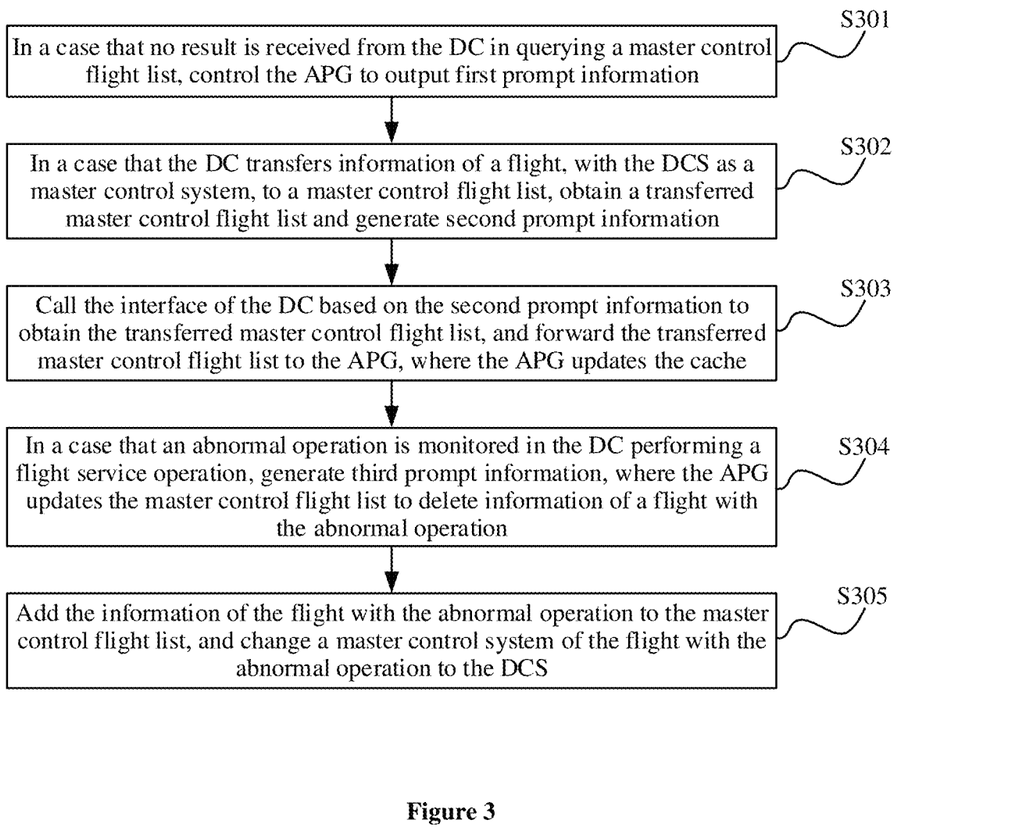
FIG. 3 is a flowchart of processing an abnormal operation of a current master control system according to an embodiment of the present disclosure.

Based on the method for processing a departure service according to the embodiments of the present disclosure, in performing step S102, in a case that it is monitored that the current master control system operates abnormally in processing the departure service, switching is performed to another system that operates normally to process the uncompleted departure service. FIG. 3 shows a flowchart of processing an abnormal operation of a current master control system according to an embodiment of the present disclosure. The process includes the following steps S301 to S305.

In step S301, in a case that no result is received from the DC in querying a master control flight list, the APG is controlled to output first prompt information.

In the above step S301, the first prompt information indicates a DC failure.

In performing step S301, in the DC querying the master control flight list, the interface of the DC is called based on the master control flight list request, and the APG is controlled to output the first prompt information in a case that no result is received from the DC.

In step S302, in a case that the DC transfers information of a flight, with the DCS as a master control system, to a master control flight list, a transferred master control flight list is obtained and second prompt information is generated.

In the above step S302, the second prompt information indicates that master control systems of flights are different.

In performing step S302, a flight with the DCS as a master control system is determined, the DC transfers information of the flight, with the DCS as the master control system, to the master control flight list, a transferred master control flight list is obtained and transmitted, and second prompt information is generated.

In step S303, the interface of the DC is called based on the second prompt information to obtain the transferred master control flight list, the transferred master control flight list is forwarded to the APG, and the APG updates the cache.

In performing step S303, the interface of the DC is called based on the second prompt information to obtain the transferred master control flight list, the obtained transferred master control flight list is forwarded to the APG, so that the APG updates the cache based on the transferred master control flight list to update master control flight information.

In step S304, in a case that an abnormal operation is monitored in the DC performing a flight service operation, third prompt information is generated, and the APG updates the master control flight list to delete information of a flight with the abnormal operation.

In the above step S304, the third prompt information indicates abnormal flight information.

The flight service operation includes at least a passenger check-in operation, a boarding operation, and/or a flight change operation.

In performing step S304, in a case that the DC serves as the current master control system and an abnormal operation is monitored in the DC performing a flight service operation, the third prompt information is generated, and the APG updates the master control flight list stored in the cache to delete information of the flight with the abnormal operation.

In step S305, the information of the flight with the abnormal operation is added to the master control flight list, and a master control system of the flight with the abnormal operation is changed to the DCS.

In performing step S305, the information of the flight with the abnormal operation is added to the master control flight list, and the master control system of the flight with the abnormal operation is switched from the DC to the DCS.

Based on the method for processing a departure service according to the embodiments of the present disclosure, a current master control system for processing the departure service is determined, and the departure service is processed by using the current master control system; on detecting that the current master control system operates abnormally in processing the departure service, switching is performed from the current master control system to another system operating normally to process the departure service; on detecting that the current master control system resumes normal operation before the departure service is processed, switching is performed from the another system to the current master control system to process the departure service; and after switching from the current master control system to the another system or switching from the another system to the current master control system, inconsistent data is corrected. According to the present disclosure, the current master control system for processing the departure service is determined, and then the DCS or the DC is used to process the departure service based on the current master control system. In a case that one of the DCS and DC fails, switching may be performed to process the departure service by using the other one of the DCS and DC that operates normally, performing automatic, intelligent and process-oriented processing on the departure service, reducing manual intervention, and thereby improving the efficiency of processing the departure service.

Figure 4:
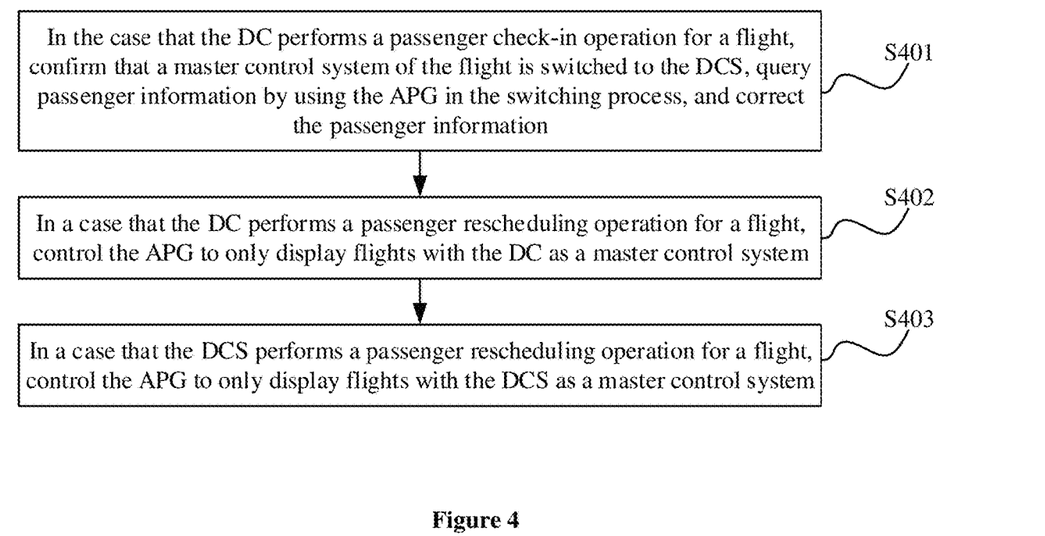
FIG. 4 is a flowchart of correcting inconsistent data before and after switching according to an embodiment of the present disclosure.

Based on the method for processing a departure service according to the above embodiments of the present disclosure, in performing step S104, after switching from the current master control system to the another system or switching from the another system to the current master control system, inconsistent data is corrected. FIG. 4 shows a flowchart of correcting inconsistent data before and after switching according to an embodiment of the present disclosure. The process includes the following steps S401 to S403.

In step S401, in a case that the DC performs a passenger check-in operation for a flight, it is confirmed that a master control system of the flight is switched to the DCS, passenger information is queried by using the APG, and the passenger information is corrected.

In performing step S401, in the case that the DC performs a passenger check-in operation for a flight, it is confirmed that a master control system of the flight is switched to the DCS, and passenger information is queried by using the APG in the switching process. If it is found that passenger information is lost, the lost passenger information is corrected.

To illustrate the above process of in the case that the DC performs a passenger check-in operation for a flight, confirming that the master control system of the flight is switched to the DCS, querying passenger information by using the APG and correcting the passenger information, an example is provided below.

Figure 5:
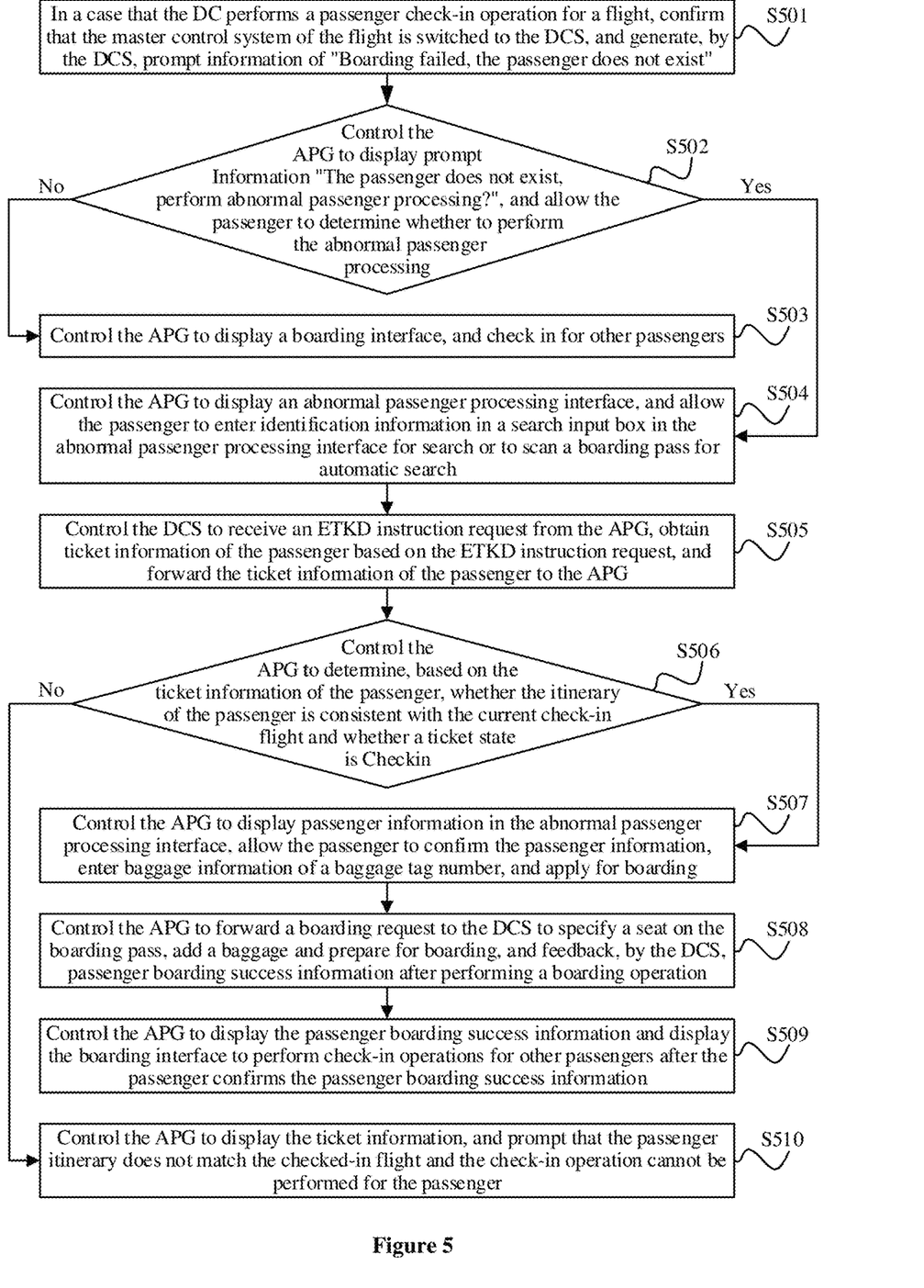
FIG. 5 is a flowchart of correcting passenger information according to an embodiment of the present disclosure.

FIG. 5 is flowchart of correcting passenger information according to an embodiment of the present disclosure.

In step S501, in a case that the DC performs a passenger check-in operation for a flight, it is confirmed that the master control system of the flight is switched to the DCS, and the DCS generates prompt information of "Boarding failed, the passenger does not exist".

In step S502, the APG is controlled to display prompt information "The passenger does not exist, perform abnormal passenger processing?", and the passenger is allowed to determine whether to perform the abnormal passenger processing. In a case of not performing the abnormal passenger processing, proceed to step S503. In a case of performing abnormal passenger processing, proceed to step S504.

In step S503, the APG is controlled to display a boarding interface, and check in for other passengers.

In step S504, the APG is controlled to display an abnormal passenger processing interface, and it is allowed for the passenger to enter identification information in a search input box in the abnormal passenger processing interface for search or it is allowed for the passenger to scan a boarding pass for automatic search.

In step S505, the DCS is controlled to receive an ETKD instruction request from the APG, ticket information of the passenger is obtained based on the ETKD instruction request, and the ticket information of the passenger is forwarded to the APG.

In step S506, the APG is controlled to determine, based on the ticket information of the passenger, whether the itinerary of the passenger is consistent with the current check-in flight and whether a ticket state is Checkin. In a case that the itinerary of the passenger is consistent with the current check-in flight and the ticket state is Checkin, proceed to step S507. In a case that the itinerary of the passenger is not consistent with the current check-in flight or the ticket state is not Checkin, proceed to step S510.

In step S507, the APG is controlled to display passenger information in the abnormal passenger processing interface, it is allowed for the passenger to confirm the passenger information, enter baggage information of a baggage tag number and apply for boarding.

In the above step S507, the passenger information includes ticket information and information on the boarding pass.

The information on the boarding pass includes a name, a cabin, a position number, identification information, itinerary information, and infant information.

In step S508, the APG is controlled to forward a boarding request to the DCS to specify a seat on the boarding pass, add a baggage and prepare for boarding, and the DCS feeds back passenger boarding success information after performing a boarding operation.

In step S509, the APG is controlled to display the passenger boarding success information, and displays the boarding interface to perform check-in operations for other passengers after the passenger confirms the passenger boarding success information.

In step S510, the APG is controlled to display the ticket information, and prompts that the passenger itinerary does not match the checked-in flight and the check-in operation cannot be performed for the passenger.

In step S402, in a case that the DC performs a passenger transferring operation for the flight, the APG is controlled to only display flights with the DC as a master control system.

In performing step S402, in a case that the DC serves as the master control system, when the DC performs a passenger transferring operation for a flight, the APG is controlled to only display flights with the DC as a master control system in a transferring flight list provided on the APG.

In step S403, in a case that the DCS performs a passenger transferring operation for the flight, the APG is controlled to only display flights with the DCS as a master control system.

In performing step S403, in a case that the DCS serves as the master control system, when the DCS performs a passenger transferring operation for a flight, the APG is controlled to only display flights with the DCS as a master control system in a transferring flight list provided on the APG.

In an embodiment of the present disclosure, in a case that a passenger is transferred from a flight with the DC as a master control system to a flight with the DCS as a master control system or from a flight with the DCS as a master control system to a flight with the DC as a master control system, it is allowed for the passenger to perform a goshow operation on the flight to which the passenger is transferred to by using the APG.

Based on the method for processing a departure service according to the embodiments of the present disclosure, a current master control system for processing the departure service is determined, and the departure service is processed by using the current master control system; on detecting that the current master control system operates abnormally in processing the departure service, switching is performed from the current master control system to another system operating normally to process the departure service; on detecting that the current master control system resumes normal operation before the departure service is processed, switching is performed from the another system to the current master control system to process the departure service; and after switching from the current master control system to the another system or switching from the another system to the current master control system, inconsistent data is corrected. According to the present disclosure, the current master control system for processing the departure service is determined, and then the DCS or the DC is used to process the departure service based on the current master control system. In a case that one of the DCS and DC fails, switching may be performed to process the departure service by using the other one of the DCS and DC that operates normally, performing automatic, intelligent and process-oriented processing on the departure service, reducing manual intervention, and thereby improving the efficiency of processing the departure service.

Figure 6:
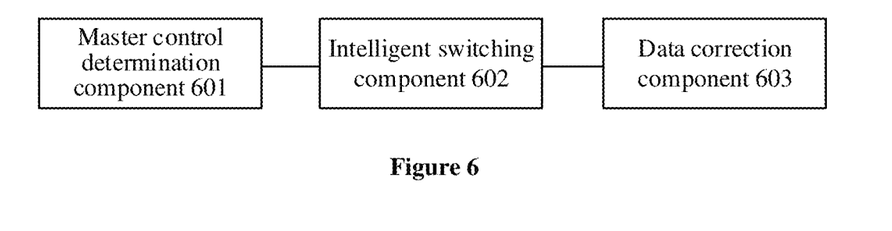
FIG. 6 is a schematic structural diagram of an apparatus for processing a departure service according to an embodiment of the present disclosure.

Corresponding to the method for processing a departure service according to the embodiments of the present disclosure, FIG. 6 shows a schematic structural diagram of an apparatus for processing a departure service according to an embodiment of the present disclosure. The apparatus for processing a departure service includes: a master control determination component 601, an intelligent switching component 602, and a data correction component 603.

The master control determination component 601 is configured to determine a current master control system for processing departure service and process the departure service by using the current master control system.

The intelligent switching component 602 is configured to: switch, on detecting that the current master control system operates abnormally in processing the departure service, from the current master control system to another system operating normally to process the departure service; and switch, on detecting that the current master control system resumes normal operation before the departure service is processed, from the another system to the current master control system to process the departure service.

The data correction component 603 is configured to: after switching from the current master control system to the another system or switching from the another system to the current master control system, correct inconsistent data.

Based on the apparatus for processing a departure service according to the embodiments of the present disclosure, a current master control system for processing the departure service is determined, and the departure service is processed by using the current master control system; on detecting that the current master control system operates abnormally in processing the departure service, switching is performed from the current master control system to another system operating normally to process the departure service; on detecting that the current master control system resumes normal operation before the departure service is processed, switching is performed from the another system to the current master control system to process the departure service; and after switching from the current master control system to the another system or switching from the another system to the current master control system, inconsistent data is corrected. According to the present disclosure, the current master control system for processing the departure service is determined, and then the DCS or the DC is used to process the departure service based on the current master control system. In a case that one of the DCS and DC fails, switching may be performed to process the departure service by using the other one of the DCS and DC that operates normally, performing automatic, intelligent and process-oriented processing on the departure service, reducing manual intervention, and thereby improving the efficiency of processing the departure service.

Figure 7:
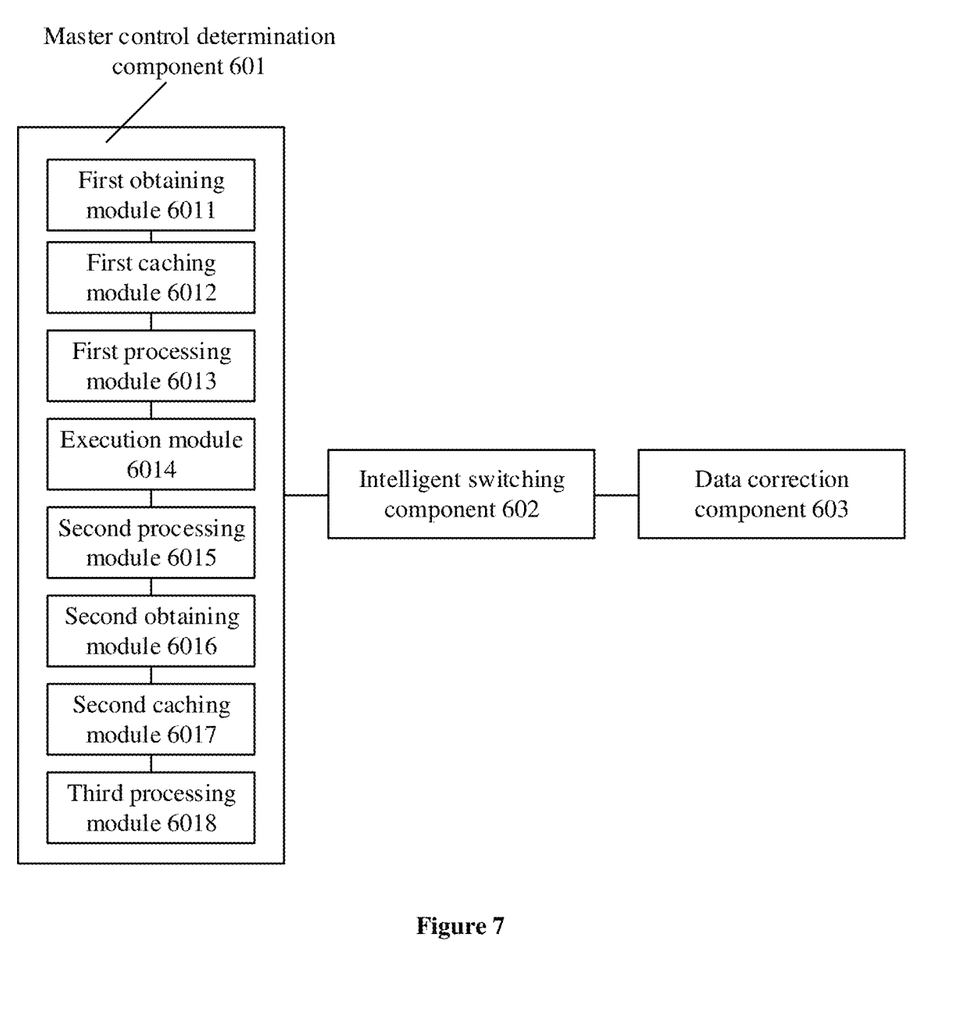
FIG. 7 is a schematic structural diagram of an apparatus for processing a departure service according to another embodiment of the present disclosure.

Based on FIG. 6, FIG. 7 shows a schematic structural diagram of a regression testing device according to another embodiment of the present disclosure. The master control determination component 601 includes: a first obtaining module 6011, a first caching module 6012, a first processing module 6013, an execution module 6014, a second processing module 6015, a second obtaining module 6016, a second caching module 6017, and a third processing module 6018.

The first obtaining module 6011 is configured to: obtain a master control flight list request from an APG, and call an interface of a DC based on the master control flight list request to obtain a master control flight list.

The first caching module 6012 is configured to forward the master control flight list to the APG. The APG sores the master control flight list in a cache.

The first processing module 6013 is configured to: in response to a master control system calling instruction from the APG, perform a calling operation based on the master control system calling instruction, and determine the current master control system. The master control calling instruction includes: a master control calling instruction indicating only accessing the DC or only accessing a departure host DCS, or a master control calling instruction indicating accessing both a departure host DCS and the DC.

The execution module 6014 is configured to process the departure service by using the current master control system.

The second processing module 6015 is configured to: in response to DEP BACKUP FLIGHT information from the DCS, forward the DEP BACKUP FLIGHT information to the APG, where the APG transmits a master control flight list request based on the DEP BACKUP FLIGHT information; and in response to NOT DISTRIBUTARY FLIGHT information from the DC, forward the NOT DISTRIBUTARY FLIGHT information to the APG, where the APG transmits a master control flight list request based on the NOT DISTRIBUTARY FLIGHT information.

The second obtaining module 6016 is configured to receive the master control flight list request, and call the interface of the DC based on the master control flight list request to obtain a master control flight list.

The second caching module 6017 is configured to forward the master control flight list to the APG. The APG updates the cache based on the received master control flight list.

The third processing module 6018 is configured to: in a case that the interface of the DC is called N times based on the master control flight list request and no master control flight list is fed back from the DC, output first prompt information. The APG transmits the master control system calling instruction indicating only accessing the DCS, and the first prompt information indicates a DC failure.

Based on the apparatus for processing a departure service according to the embodiments of the present disclosure, a current master control system for processing the departure service is determined, and the departure service is processed by using the current master control system; on detecting that the current master control system operates abnormally in processing the departure service, switching is performed from the current master control system to another system operating normally to process the departure service; on detecting that the current master control system resumes normal operation before the departure service is processed, switching is performed from the another system to the current master control system to process the departure service; and after switching from the current master control system to the another system or switching from the another system to the current master control system, inconsistent data is corrected. According to the present disclosure, the current master control system for processing the departure service is determined, and then the DCS or the DC is used to process the departure service based on the current master control system. In a case that one of the DCS and DC fails, switching may be performed to process the departure service by using the other one of the DCS and DC that operates normally, performing automatic, intelligent and process-oriented processing on the departure service, reducing manual intervention, and thereby improving the efficiency of processing the departure service.

Figure 8:
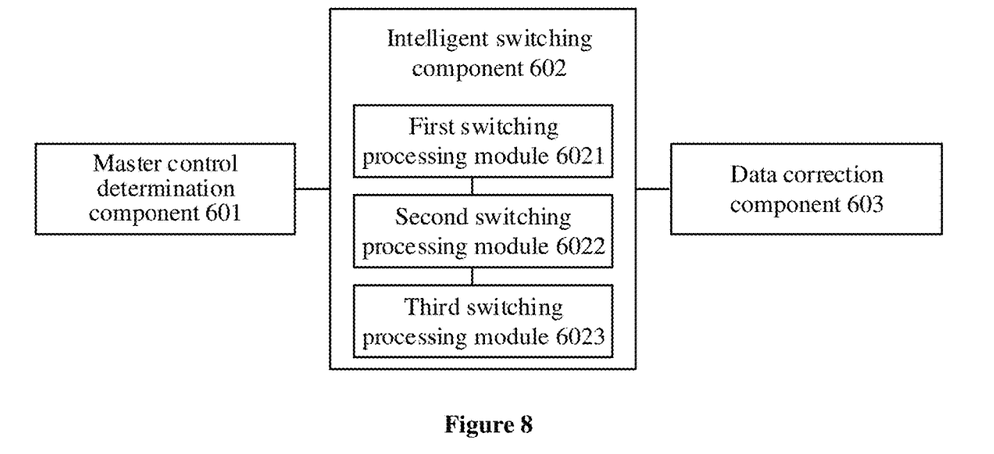
FIG. 8 is a schematic structural diagram of an apparatus for processing a departure service according to another embodiment of the present disclosure.

Based on FIG. 6, FIG. 8 shows a schematic structural diagram of a regression testing device according to another embodiment of the present disclosure. The intelligent switching component 602 includes: a first switching processing module 6021, a second switching processing module 6022 and a third switching processing module 6023.

The first switching processing module 6021 is configured to, in a case that no result is received from a DC in querying a master control flight list, control an APG to output first prompt information. The first prompt information indicates a DC failure.

The second switching processing module 6022 is configured to: in a case that a DC transfers information of a flight, with a DCS as a master control system, to a master control flight list, obtain a transferred master control flight list, and generate second prompt information, where the second prompt information indicates that master control systems of flights are different; and call an interface of the DC based on the second prompt information to obtain the transferred master control flight list and forward the transferred master control flight list to an APG. Then, the APG updates a cache.

The third switching processing module 6023 is configured to: in a case that an abnormal operation is monitored in an DC performing a flight service operation, generate third prompt information, where an APG updates a master control flight list to delete information of a flight with the abnormal operation, the third prompt information indicates abnormal flight information, and the flight service operation includes at least a passenger check-in operation, a boarding operation, and/or a flight change operation; add the information of the flight with the abnormal operation to the master control flight list, and change a master control system of the flight with the abnormal operation to a DCS.

Based on the apparatus for processing a departure service according to the embodiments of the present disclosure, a current master control system for processing the departure service is determined, and the departure service is processed by using the current master control system; on detecting that the current master control system operates abnormally in processing the departure service, switching is performed from the current master control system to another system operating normally to process the departure service; on detecting that the current master control system resumes normal operation before the departure service is processed, switching is performed from the another system to the current master control system to process the departure service; and after switching from the current master control system to the another system or switching from the another system to the current master control system, inconsistent data is corrected. According to the present disclosure, the current master control system for processing the departure service is determined, and then the DCS or the DC is used to process the departure service based on the current master control system. In a case that one of the DCS and DC fails, switching may be performed to process the departure service by using the other one of the DCS and DC that operates normally, performing automatic, intelligent and process-oriented processing on the departure service, reducing manual intervention, and thereby improving the efficiency of processing the departure service.

Figure 9:
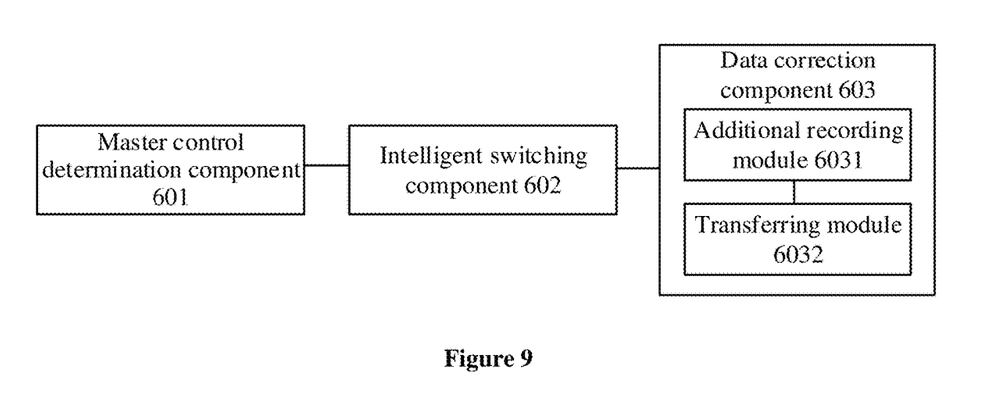
FIG. 9 is a schematic structural diagram of an apparatus for processing a departure service according to another embodiment of the present disclosure.

Based on FIG. 6, FIG. 9 shows a schematic structural diagram of a regression testing device according to another embodiment of the present disclosure. The data correction component 603 includes: an additional recording module 6031 and a transferring module 6032.

The additional recording module 6031 is configured to: in a case that a DC performs a passenger check-in operation for a flight, confirm that a master control system of the flight is switched to a DCS, query passenger information by using an APG, and correct the passenger information.

The transferring module 6032 is configured to: in a case that a DC performs a passenger transferring operation for a flight, control an APG to only display flights with the DC as a master control system; and in a case that a DCS performs a passenger transferring operation for a flight, control an APG to only display flights with the DCS as a master control system.

Based on the apparatus for processing a departure service according to the embodiments of the present disclosure, a current master control system for processing the departure service is determined, and the departure service is processed by using the current master control system; on detecting that the current master control system operates abnormally in processing the departure service, switching is performed from the current master control system to another system operating normally to process the departure service; on detecting that the current master control system resumes normal operation before the departure service is processed, switching is performed from the another system to the current master control system to process the departure service; and after switching from the current master control system to the another system or switching from the another system to the current master control system, inconsistent data is corrected. According to the present disclosure, the current master control system for processing the departure service is determined, and then the DCS or the DC is used to process the departure service based on the current master control system. In a case that one of the DCS and DC fails, switching may be performed to process the departure service by using the other one of the DCS and DC that operates normally, performing automatic, intelligent and process-oriented processing on the departure service, reducing manual intervention, and thereby improving the efficiency of processing the departure service.

Figure 10:
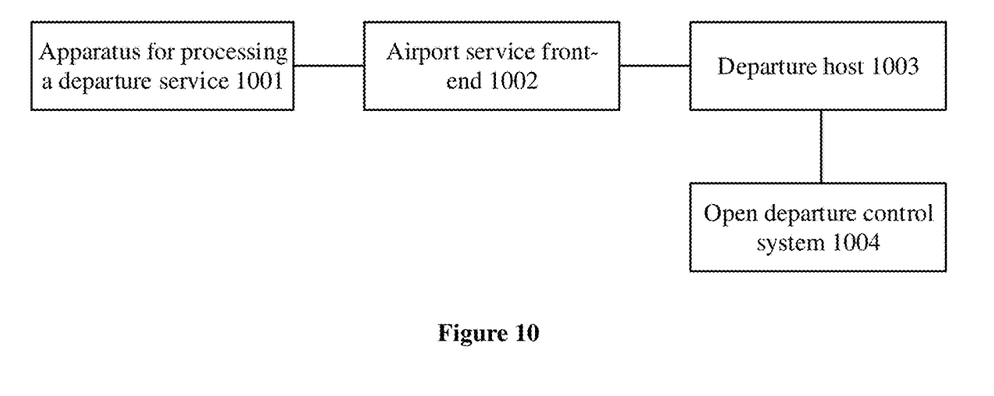
FIG. 10 is a schematic structural diagram of a system for processing a departure service according to an embodiment of the present disclosure.

Based on the method for processing a departure service and the apparatus for processing a departure service according to the embodiments of the present disclosure, a system for processing a departure service is further provided according to an embodiment of the present disclosure. As shown in FIG. 10, the system includes an apparatus for processing a departure service 1001, an airport service front-end 1002, a departure host 1003 and an open departure control system 1004.

The apparatus for processing a departure service 1001 is configured to: receive a master control flight list request from the airport service front-end, determine whether a current master control system for processing the departure service is a DCS or a DC, and process the departure service by using the current master control system; switch, on detecting that the current master control system operates abnormally in processing the departure service, from the current master control system to another system operating normally to process the departure service; switch, on detecting that the current master control system resumes normal operation before the departure service is processed, from the another system to the current master control system to process the departure service; and after switching from the current master control system to the another system or switching from the another system to the current master control system, correct inconsistent data.

The airport service front-end 1002 is configured to transmit the master control flight list request, and provide a front-end interaction interface for the current master control system.

The departure host 1003 is configured to, in a case of serving as the current master control system, process the departure service.

The open departure control system 1004 is configured to, in a case of serving as the current master control system, process the departure service.

Based on the system for processing a departure service according to the embodiments of the present disclosure, a current master control system for processing the departure service is determined, and the departure service is processed by using the current master control system; on detecting that the current master control system operates abnormally in processing the departure service, switching is performed from the current master control system to another system operating normally to process the departure service; on detecting that the current master control system resumes normal operation before the departure service is processed, switching is performed from the another system to the current master control system to process the departure service; and after switching from the current master control system to the another system or switching from the another system to the current master control system, inconsistent data is corrected. According to the present disclosure, the current master control system for processing the departure service is determined, and then the DCS or the DC is used to process the departure service based on the current master control system. In a case that one of the DCS and DC fails, switching may be performed to process the departure service by using the other one of the DCS and DC that operates normally, performing automatic, intelligent and process-oriented processing on the departure service, reducing manual intervention, and thereby improving the efficiency of processing the departure service.

According to the above description of the disclosed embodiments, those skilled in the art can implement or practice the present disclosure. Various modifications to the embodiments are apparent to those skilled in the art, and the general principle defined herein may be implemented in other embodiments without departing from the spirit or scope of the present disclosure. Therefore, the present disclosure is not limited to the embodiments described herein, and is in accordance with the broadest scope consistent with the principle and novel features disclosed herein.

The invention claimed is:

1. A method for processing a departure service, comprising:
    determining a current master control system for processing the departure service, and processing the departure service by using the current master control system;
    switching, on detecting that the current master control system operates abnormally in processing the departure service, from the current master control system to another system operating normally to process the departure service;
    switching, on detecting that the current master control system resumes normal operation before the departure service is completed, from the another system to the current master control system to process the departure service; and
    after switching from the current master control system to the another system or switching from the another system to the current master control system, correcting inconsistent data;
    wherein the determining a current master control system for processing the departure service and processing the departure service by using the current master control system comprises:
    obtaining a master control flight list request from an airport service front-end APG (Airport GUI) server, and calling an interface of an open DC (departure control) server based on the master control flight list request to obtain a master control flight list;
    forwarding the master control flight list to the APG server, wherein the APG server sores the master control flight list in a cache;
    in response to a master control system calling instruction from the APG server, performing a calling operation based on the master control system calling instruction, and determining the current master control system, wherein the master control calling instruction comprises: a master control calling instruction indicating only accessing the DC server or only accessing a departure control system (DCS) server or a master control calling instruction indicating accessing both the DCS server and the DC; and
    processing the departure service by using the current master control system.

2. The method according to claim 1, further comprising:
    in response to DEP (data execution prevention) BACKUP FLIGHT information from the DCS server, forwarding the DEP BACKUP FLIGHT information to the APG server, wherein the APG server transmits a master control flight list request based on the DEP BACKUP FLIGHT information;
    in response to NOT DISTRIBUTARY FLIGHT information from the DC, forwarding the NOT DISTRIBUTARY FLIGHT information to the APG server, wherein the APG server transmits a master control flight list request based on the NOT DISTRIBUTARY FLIGHT information;
    receiving the master control flight list request, and calling the interface of the DC server based on the master control flight list request to obtain a master control flight list; and
    forwarding the master control flight list to the APG server, wherein the APG server updates the cache based on the received master control flight list.

3. The method according to claim 1, further comprising:
    in a case that the interface of the DC server is called N times based on the master control flight list request and no master control flight list is fed back from the DC, outputting first prompt information, wherein the APG server transmits the master control system calling instruction indicating only accessing the DCS server, and the first prompt information indicates a DC server failure.

4. The method according to claim 1, wherein the switching, on detecting that the current master control system operates abnormally in processing the departure service, from the current master control system to another system operating normally to process the uncompleted departure service comprises:
    in a case that no result is received from a DC server in querying a master control flight list, controlling an APG server to output first prompt information, wherein the first prompt information indicates a DC server failure; and/or
    in a case that a DC server transfers information of a flight, with a DCS server as a master control system, to a master control flight list, obtaining a transferred master control flight list, and generating second prompt information, wherein the second prompt information indicates that master control systems of flights are different; and calling an interface of the DC server based on the second prompt information to obtain the transferred master control flight list, and forwarding the transferred master control flight list to an APG server, wherein the APG server updates a cache; and/or
    in a case that an abnormal operation is monitored in a DC server performing a flight service operation, generating third prompt information, wherein an APG server updates a master control flight list to delete information of a flight with the abnormal operation, the third prompt information indicates abnormal flight information, and the flight service operation comprises at least a passenger check-in operation, a boarding operation, and/or a flight change operation; adding the information of the flight with the abnormal operation to the master control flight list, and changing a master control system of the flight with the abnormal operation to a DCS server.

5. The method according to claim 1, wherein the after switching from the current master control system to the another system or switching from the another system back to the current master control system, correcting inconsistent data comprises:
    in a case that a DC server performs a passenger check-in operation for a flight, confirming that a master control system of the flight is switched to a DCS server, querying passenger information by using an APG server, and correcting the passenger information;

in a case that a DC server performs a passenger transferring operation for a flight, controlling an APG server to only display flights with the DC server as a master control system server; and in a case that a DCS server performs a passenger transferring operation for a flight, controlling an APG server to only display flights with the DCS server as a master control system.

6. An apparatus for processing a departure service, comprising:

a memory, storing a computer program; and a processor, wherein the processor is configured, when executing the computer program, to:

determine a current master control system for processing departure service and process the departure service by using the current master control system;

switch, on detecting that the current master control system operates abnormally in processing the departure service, from the current master control system to another system operating normally to process the departure service; and switch, on detecting that the current master control system resumes normal operation before the departure service is processed, from the another system to the current master control system to process the departure service; and after switching from the current master control system to the another system or switching from the another system to the current master control system, correct inconsistent data;

wherein the processor is further configured to:

obtain a master control flight list request from an airport service front-end APG server, and call an interface of an open DC (departure control) server based on the master control flight list request to obtain a master control flight list;

forward the master control flight list to the APG server, wherein the APG server sores the master control flight list in a cache;

in response to a master control system calling instruction from the APG server, perform a calling operation based on the master control system calling instruction, and determine the current master control system, wherein the master control calling instruction comprises: a master control calling instruction indicating only accessing the DC server or only accessing a DCS server or a master control calling instruction indicating accessing both the DCS server and the DC; and process the departure service by using the current master control system.

7. The apparatus according to claim 6, wherein processor is further configured to:

in response to DEP BACKUP FLIGHT information from the DCS server, forward the DEP BACKUP FLIGHT information to the APG server, wherein the APG server transmits a master control flight list request based on the DEP BACKUP FLIGHT information; and in response to NOT DISTRIBUTARY FLIGHT information from the DC, forward the NOT DISTRIBUTARY FLIGHT information to the APG server, wherein the APG server transmits a master control flight list request based on the NOT DISTRIBUTARY FLIGHT information;

receive the master control flight list request, and call the interface of the DC server based on the master control flight list request to obtain a master control flight list; and forward the master control flight list to the APG server, wherein the APG server updates the cache based on the received master control flight list.

8. A system for processing a departure service, comprising: an apparatus for processing a departure service, an airport service front-end APG (Airport GUI) server, a DCS server, and an open DC (departure control) server; wherein the apparatus for processing a departure service is configured to: receive a master control flight list request from the airport service front-end APG server, determine whether a current master control system for processing the departure service is the DCS server or the DC, and process the departure service by using the current master control system; switch, on detecting that the current master control system operates abnormally in processing the departure service, from the current master control system to another system operating normally to process the departure service; switch, on detecting that the current master control system resumes normal operation before the departure service is processed, from the another system to the current master control system to process the departure service; and after switching from the current master control system to the another system or switching from the another system to the current master control system, correct inconsistent data; and the apparatus for processing a departure service is further configured to: obtain a master control flight list request from the APG server, and call an interface of the DC server based on the master control flight list request to obtain a master control flight list; forward the master control flight list to the APG server, wherein the APG server sores the master control flight list in a cache; in response to a master control system calling instruction from the APG server, perform a calling operation based on the master control system calling instruction, and determine the current master control system, wherein the master control calling instruction comprises: a master control calling instruction indicating only accessing the DC server or only accessing a DCS server or a master control calling instruction indicating accessing both the DCS server and the DC; and process the departure service by using the current master control system;

the airport service front-end APG server is configured to transmit the master control flight list request, and provide a front-end interaction interface for the current master control system;

the DCS server is configured to, in a case of serving as the current master control system, process the departure service; and the DC server is configured to, in a case of serving as the current master control system, process the departure service.

* * * * *